(12) United States Patent
Wolf et al.

(10) Patent No.: US 10,033,435 B2
(45) Date of Patent: Jul. 24, 2018

(54) APPARATUS, SYSTEM AND METHOD OF DETECTING AN ACTIVITY OF A WIRELESS COMMUNICATION DEVICE

(71) Applicant: INTEL IP CORPORATION, Santa Clara, CA (US)

(72) Inventors: Shahar Wolf, Haifa (IL); Sergey Sofer, Rishon Lezion (IL)

(73) Assignee: INTEL IP CORPORATION, Santa Clara, CA (US)

( * ) Notice: Subject to any disclaimer, the term of this patent is extended or adjusted under 35 U.S.C. 154(b) by 198 days.

(21) Appl. No.: 14/315,587

(22) Filed: Jun. 26, 2014

(65) Prior Publication Data

US 2015/0381238 A1 Dec. 31, 2015

(51) Int. Cl.
*H04B 5/00* (2006.01)
*H04W 4/80* (2018.01)

(52) U.S. Cl.
CPC ............ *H04B 5/0031* (2013.01); *H04W 4/80* (2018.02)

(58) Field of Classification Search
CPC ... H04B 5/0031; H04B 5/0037; H04B 5/0056
USPC .................... 455/41.1, 41.2, 41.3
See application file for complete search history.

(56) References Cited

U.S. PATENT DOCUMENTS

| 7,202,784 | B1 | 4/2007 | Herwig |
| 8,117,445 | B2 | 2/2012 | Werner et al. |
| 9,154,959 | B2 | 10/2015 | Sofer et al. |
| 2007/0177738 | A1 | 8/2007 | Diorio et al. |
| 2008/0155257 | A1 | 6/2008 | Werner et al. |
| 2009/0267747 | A1 | 10/2009 | Rivest et al. |
| 2012/0075059 | A1 | 3/2012 | Fyke et al. |
| 2012/0145795 | A1 | 6/2012 | Launay |
| 2012/0220229 | A1 | 8/2012 | Cheon et al. |
| 2013/0076491 | A1* | 3/2013 | Brandsma et al. .......... 340/10.3 |
| 2013/0309967 | A1* | 11/2013 | Hillan ...................... H04B 5/00 455/41.1 |
| 2014/0086292 | A1* | 3/2014 | Akhavan .................. H04B 5/00 375/224 |
| 2014/0125139 | A1* | 5/2014 | Wang et al. .................. 307/104 |

(Continued)

FOREIGN PATENT DOCUMENTS

| CA | 2753493 | 3/2012 |
| CN | 101162530 | 4/2008 |
| CN | 101645129 | 2/2010 |

(Continued)

OTHER PUBLICATIONS

NFC Technology, "Security Concerns with NFC Technology", 1 page. Available at : http://www.nearfieldcommunication.org/nfc-security.html.

(Continued)

*Primary Examiner* — Xin Jia
(74) *Attorney, Agent, or Firm* — Shichrur & Co.

(57) ABSTRACT

Some demonstrative embodiments include apparatuses, systems and/or methods of detecting an activity of a wireless communication device. For example, a Near Field Communication (NFC) device may include a transmitter to transmit information to a polling device by modulating a carrier signal emitted by the polling device; a sensor to sense a plurality of sensed modulation levels of the carrier signal; and a controller to detect an activity of an other NFC device based on the sensed modulation levels.

22 Claims, 5 Drawing Sheets

(56) References Cited

U.S. PATENT DOCUMENTS

2015/0180546 A1\* 6/2015 Dhayni ........................ 455/41.1
2015/0181435 A1 7/2015 Soler et al.

FOREIGN PATENT DOCUMENTS

| CN | 101645130 | 2/2010 |
| CN | 102122415 | 7/2011 |
| FR | 2921786 | 4/2009 |
| WO | 2011094995 | 8/2011 |
| WO | 2012130130 | 10/2012 |
| WO | 2012155620 | 11/2012 |
| WO | 2012163244 | 12/2012 |

OTHER PUBLICATIONS

Sergey, et al., "Systems and Methods for Securing Near Field Communications", U.S. Appl. No. 14/135,875, filed Dec. 20, 2013, 38 pages.

ISO/IEC 14443-1:2008; Identification cards—Contactless integrated circuit(s) cards—Proximity cards—Part 1: Physical characteristics, 8 pages.

Office Action for U.S. Appl. No. 14/135,875, dated Apr. 2, 2015, 6 pages.

\* cited by examiner

APPARATUS, SYSTEM AND METHOD OF DETECTING AN ACTIVITY OF A WIRELESS COMMUNICATION DEVICE

TECHNICAL FIELD

Embodiments described herein generally relate to detecting an activity of a wireless communication device.

BACKGROUND

Wireless communication devices may utilize short-range wireless communication to communicate information between the wireless communication devices, e.g., when the wireless communication devices are at close proximity.

For example, the Near Field Communication (NFC) technology may be used by battery-powered or battery-less devices, for example, mobile devices, mobile phones, computing devices, and/or cards, to communicate information of one or more proximity-based applications.

In one example, a user may bring a first mobile phone in proximity to a second mobile phone, in order to exchange data between the first and second mobile phones.

In another example, a user may bring a device, e.g., a mobile phone or a card, in proximity to a payment terminal to perform a payment transaction.

Some proximity-based technologies, e.g., the NFC technology, may be configured for direct communication between two devices. As a result, the performance and/or a security level of the communication between the two devices may be affected by activity of a third device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
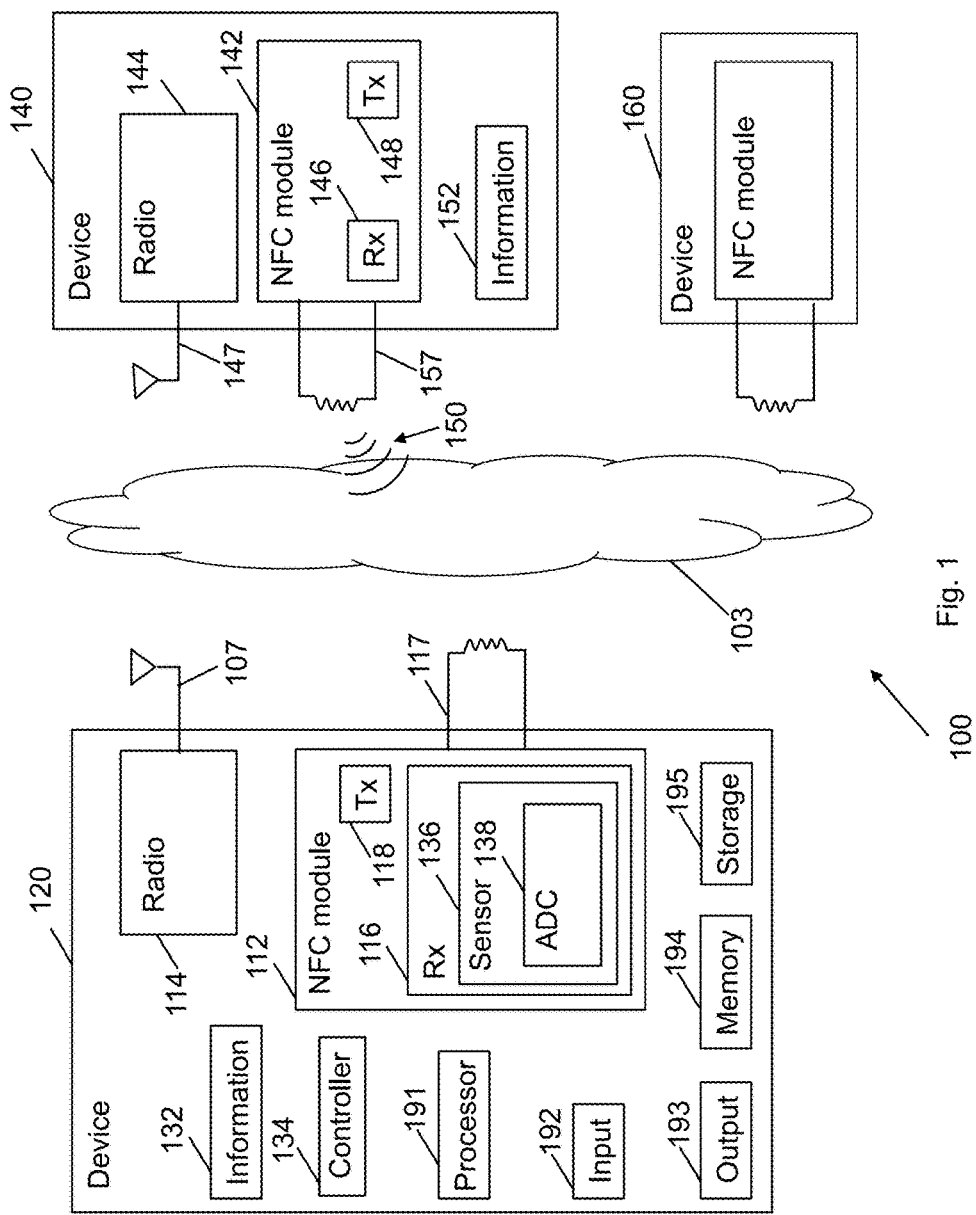
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, an NFC device, an NFC card, a device including NFC functionality, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an onboard device, an off-board device, a hybrid device, a vehicular device, a non-vehicular device, a mobile or portable device, a consumer device, a non-mobile or non-portable device, a wireless communication station, a wireless communication device, a video device, an audio device, an audio-video (A/V) device, and the like.

Some embodiments may be used in conjunction with devices and/or networks operating in accordance with existing Near Field Communication (NFC) specifications ("*ISO/IEC 18000-3:2010 Information technology—Radio frequency identification for item management—Part 3: Parameters for air interface communications at 13.56 MHz*", and/or "*ISO/IEC 14443-1:2008 Identification cards—Contactless integrated circuit cards—Proximity cards—Part 1: Physical characteristics*"), and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; IEEE802.11 task group ac (TGac) ("*IEEE802.11-09/0308r12—TGac Channel Model Addendum Document*");

IEEE 802.11 task group ad (TGad) (*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band,* 28 Dec., 2012)) and/or future versions and/or derivatives thereof, devices and/or networks operating in accordance with existing WirelessHD™ specifications, and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification version* 1.2, 2012) and/or future versions and/or derivatives thereof, units and/or devices which are part of the above networks, and the like.

Some embodiments may be used in conjunction with a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, an NFC antenna, a coil, a wire, an embedded antenna, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals over a wireless communication medium (WM) 103. For example, system 100 may include wireless communication devices 120 and/or 140.

In some demonstrative embodiments, WM 103 may include, for example, a Near Field Communication (NFC) channel, and/or any other short-range communication medium or proximity-based communication medium, for example, a Radio Frequency (RF) channel, an Infra Red (IR) channel, a Personal Area Network (PAN) channel and the like.

In some demonstrative embodiments, devices 120 and 140 may include NFC devices capable of communicating via an NFC channel. Additionally or alternatively, is some embodiments devices 120 and 140 may any other short-range or proximity-based wireless communication devices.

In some demonstrative embodiments, device 140 may perform the functionality of an NFC polling device (also referred to as "an NFC reader device" or "an NFC master device").

In some demonstrative embodiments, device 140 may include a mobile or a non-mobile device.

In some demonstrative embodiments, device 140 may include, for example, a PC, a desktop computer, a mobile computer, a laptop computer, an Ultrabook™ computer, a notebook computer, a tablet computer, a server computer, a terminal, a payment terminal, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a digital audio player, a gaming device, a data source, a data sink, a Digital Still camera (DSC), a media player, a Smartphone, a television, a music player, or the like.

In some demonstrative embodiments, device 120 may perform the functionality of a listening NFC device (also referred to as "an NFC writer device" or "an NFC slave device").

In some demonstrative embodiments, device 120 may include a battery-powered device, e.g., as described below.

In some demonstrative embodiments, device 120 may include an NFC emulated card device. For example, device 120 may include an NFC-equipped mobile device.

In some demonstrative embodiments, device 120 may include, for example, a mobile computer, a laptop computer, a notebook computer, a tablet computer, an Ultrabook™ computer, a mobile internet device, a portable computer, a wearable device, an Internet of Things (IoT) device, a consumer device, a handheld computer, a handheld device, a PDA device, a handheld PDA device, an on-board device, an off-board device, a consumer device, a vehicular device, a non-vehicular device, a portable device, a PCS device, a mobile or portable GPS device, a DVB device, a relatively small computing device, a non-desktop computer, CSLL device, an UMD, an UMPC, a MID, an "Origami" device or computing device, a device that supports DCC, a video device, an audio device, an A/V device, a gaming device, a media player, or the like.

In some demonstrative embodiments, devices 120 and/or 140 may also include, for example, a processor 191, an input unit 192, an output unit 193, a memory unit 194, and/or a storage unit 195. Devices 120 and/or 140 may optionally include other suitable hardware components and/or software components. In some demonstrative embodiments, some or all of the components of devices 120 and/or 140 may be enclosed in a common housing or packaging, and may be interconnected or operably associated using one or more wired or wireless links. In other embodiments, components of devices 120 and/or 140 may be distributed among multiple or separate devices.

Processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of device 120 and/or of one or more suitable applications.

Memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 120.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, Cathode Ray Tube (CRT) display unit, one or more audio speakers or earphones, or other suitable output devices.

In some demonstrative embodiments, devices 120 and 140 may include one or more radios to perform non-NFC wireless communication, e.g., WLAN communication, WiFi communication, cellular communication, and/or the like, between devices 120 and 140 and/or with one or more other wireless communication devices. For example, device 120 may include a radio 114, and/or device 140 may include a radio 144. For example, radios 114 and/or 144 may include, for example, one or more wireless transmitters, receivers and/or transceivers able to send and/or receive wireless communication signals, RF signals, frames, blocks, transmission streams, packets, messages, data items, and/or data over one or more wireless communication channels, e.g., WiFi channels, cellular channels, and the like.

In some demonstrative embodiments, radios 114 and/or 144 may include, or may be associated with, one or more antennas. For example, radio 114 may be associated with antennas 107, and/or radio 144 may be associated with antennas 147.

Antennas 107 and/or 147 may include any type of antennas suitable for transmitting and/or receiving wireless communication signals, blocks, frames, transmission streams, packets, messages and/or data. For example, Antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 120 may include a battery-less device or a battery-assisted device, e.g., as described below.

In some demonstrative embodiments, device 120 may include an NFC card. For example, device 120 may include an NFC smartcard, an NFC key, an NFC tag or the like.

In one example, device 120 may not include, one or more of processor 191, input unit 192, output unit 193, memory unit 194, and/or storage unit 195, for example, if device 120 includes an NFC card device.

In some demonstrative embodiments, devices 120 and 140 may include one or more NFC modules to perform NFC communication between devices 120 and 140, and/or with one or more other NFC devices. For example, device 120 may include an NFC module 112, and/or device 140 may include an NFC module 142.

In some demonstrative embodiments, NFC modules 112 and/or 142 may include one or more NFC receivers (Rx), to receive NFC signals, frames, blocks, transmission streams, packets, messages, data items, and/or data. For example, NFC module 112 may include a receiver 116, and/or NFC module 142 may include a receiver 146.

In some demonstrative embodiments, NFC modules 112 and/or 142 may include one or more NFC transmitters (Tx), to send NFC signals, frames, blocks, transmission streams, packets, messages, data items, and/or data. For example, NFC module 112 may include a transmitter 118, and/or NFC module 142 may include a transmitter 148.

In some demonstrative embodiments, NFC modules 112 and/or 142 may include modulation elements, demodulation elements, amplifiers, analog to digital converters, digital to analog converters, filters, and/or the like. For example, NFC modules 112 and/or 142 may include or may be implemented as part of an Integrated Chip (IC), a System on Chip (SoC), and/or the like.

In some demonstrative embodiments, NFC modules 112 and/or 142 may include, or may be associated with, one or more NFC antennas. For example, NFC module 112 may be associated with an antenna 117, and/or NFC module 142 may be associated with an antenna 157.

In some demonstrative embodiments, antennas 117 and/or 157 may include any type of antennas suitable for NFC communication. For example, antennas 117 and/or 157 may include an NFC coil, e.g., a printed circuit board (PCB) coil, a flexible printed circuit (FPC) coil, a metal wire, e.g., created through a laser direct structuring (LDS) process, and/or a coil directly embedded on a metallic chassis and/or under a conductive coating of devices 120 and/or 140.

In some demonstrative embodiments, antennas 117 and 107 may be implemented using separate antenna elements; and/or antennas 157 and 147 may be implemented using separate antenna elements. In other embodiments, antennas 117 and 107 may be implemented using one or more common and/or integrated antenna elements; and/or antennas 157 and 147 may be implemented using one or more common and/or integrated antenna elements.

In some demonstrative embodiments, devices 120 and 140 may be configured to establish a connection, for example, to perform one or more communication activities or sessions between devices 120 and 140, e.g., to perform a payment, to perform a transaction, to exchange data, and/or to perform any other operation.

In some demonstrative embodiments, devices 120 and 140 may establish the connection, for example, responsive to tapping device on device 140, and/or by bringing device 120 within close proximity of device 140, e.g., a proximity of between a few millimeters and a few centimeters.

In one example, a user of device 120 may bring device 120 in proximity to device 140, in order to exchange data between devices 120 and 140.

In another example, the user of device 120 may bring device 120 in proximity to device 140 to perform a payment transaction.

In one example, device 120 may include a Smartphone including a digital wallet application, and device 140 may include a payment terminal. According to this example, a user of the Smartphone may bring the Smartphone in close proximity to the payment terminal to perform a payment transaction.

In another example, both devices 120 and 140 may include a Smartphone. According to this example, bringing the two Smartphones within close proximity may enable exchanging data, e.g., transferring files, between the two Smartphones.

In some demonstrative embodiments, NFC modules 112 and 142 may be configured to communicate information by modulating a carrier signal 150 emitted by NFC module 142, e.g., as described below.

In some demonstrative embodiments, transmitter 148 may emit carrier signal 150 over WM 103, and transmitter 148 may modulate carrier signal, e.g., to transmit information to another wireless communication device, e.g., device 120.

In some demonstrative embodiments, transmitter 148 may modulate first information 152 over carrier signal 150 according to a modulation scheme ("the polling modulation scheme"), which may define a plurality of polling modulation levels, for example, two polling modulation levels representing two logical values, e.g., zero and one.

In some demonstrative embodiments, first information 152 may include a request to receive information from device 120, e.g., a request to receive from device 120 information to be utilized as part of a payment transaction, e.g., a credit card number of a user of device 120, personal details of the user of device 120, authentication and/or verification information, e.g., a unique key and/or a code, and/or any other information.

In some demonstrative embodiments, device 120 may receive carrier signal 150, e.g., via antenna 117.

In some demonstrative embodiments, receiver 116 may receive carrier signal 150, and may demodulate carrier signal 150 to extract first information 152 from carrier signal 150.

In some demonstrative embodiments, device 120 may process first information 152, and may respond to device 140.

In some demonstrative embodiments, transmitter 118 may transmit second information 132 to device 140, for example, in response to first information 152.

In one example, second information 132 may include information corresponding to the requested information, as requested by device 140.

In some demonstrative embodiments, transmitter 118 may transmit second information 132 to device 140 by modulating carrier signal 150.

In some demonstrative embodiments, transmitter 118 may modulate carrier signal 150 by modulating a load on antennas 117 (FIG. 1).

In some demonstrative embodiments, transmitter 118 may modulate carrier signal 150 according to a modulation scheme ("the load modulation scheme") including a predefined number of transmission modulation levels.

In some demonstrative embodiments, the predefined number of the transmission modulation levels may include two predefined transmission modulation levels. For example, the transmission modulation levels may include a first modulation level, e.g., representing a logical zero, and a second modulation level, e.g., representing a logical one, e.g., as described below with reference to FIG. 2.

In other embodiments, the load modulation scheme may include any other number of predefined modulation levels.

Figure 2:
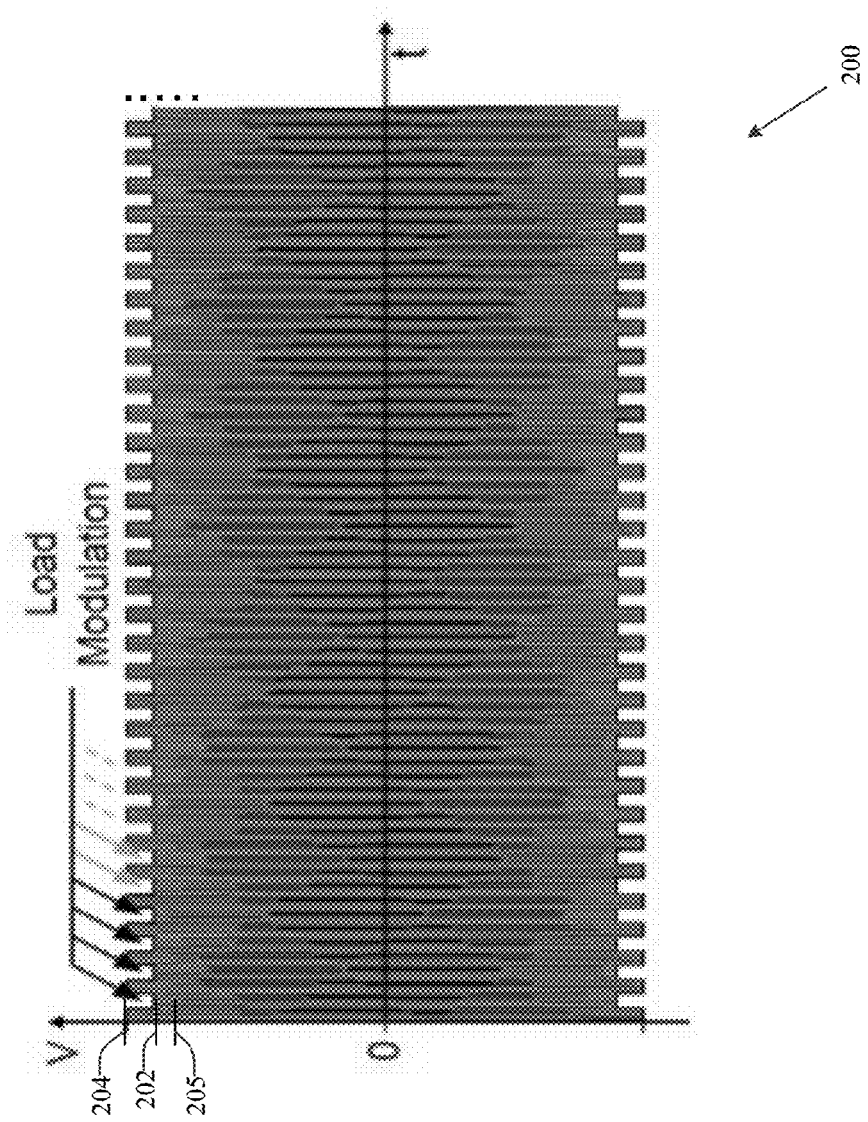
FIG. 2 is a schematic illustration of a graph depicting amplitudes of a modulated carrier signal versus time, in accordance with some demonstrative embodiments.

Reference is now made to FIG. 2, which schematically illustrates a graph 200 depicting amplitudes of a carrier signal 250 being modulated by a listening NFC device versus time, in accordance with some demonstrative embodiments. For example, carrier signal 250 may include carrier signal 150 (FIG. 1), which may be emitted by device 140 (FIG. 1), and/or the listening NFC device may perform the functionality of device 120 (FIG. 1).

As shown in FIG. 2, carrier signal 250 may be modulated according to a first amplitude level 202 and a second amplitude level 204.

In one example, first amplitude level 202 may correspond to a first transmission modulation level, and/or second amplitude level 204 may correspond to a second transmission modulation level.

In some demonstrative embodiments, transmitter 118 (FIG. 1) may modulate carrier signal 250 according to the first modulation level 202, e.g., to represent a logical zero, or according the second modulation level 204, e.g., to represent a logical one.

In some demonstrative embodiments, transmitter 118 (FIG. 1) may modulate carrier signal 250 according to the first amplitude level 202, for example, by applying a first load on antennas 117 (FIG. 1).

In some demonstrative embodiments, transmitter 118 (FIG. 1) may modulate carrier signal 250 according to the second amplitude level 204, for example, by applying a second load, e.g., lesser than the first load, on antennas 117 (FIG. 1), or by not applying any load on antennas 117 (FIG. 1).

As shown in FIG. 2, a difference between amplitude levels 202 and 204 may be relatively small compared to a magnitude of amplitude levels 202 and 204.

Referring back to FIG. 1, in some demonstrative embodiments, device 140 may receive carrier signal 150, which may be modulated by transmitter 118.

In some demonstrative embodiments, receiver 146 may sense carrier signal 150 and may demodulate carrier signal 150 to extract second information 132.

In some demonstrative embodiments, device 120 and 140 may terminate communication between devices 120 and 140, for example, upon extracting second information 132 and/or upon completing the communications between devices 120 and 140.

In some demonstrative embodiments, another device, e.g., a wireless communication device 160, may be in proximity to devices 120 and/or 140.

In one example, device 160 may include a battery-operated device, e.g., a Smartphone having an NFC emulated card.

In another example, device 160 may include a battery-less device, e.g., an NFC card.

In some demonstrative embodiments, the performance and/or a security level of the communications between devices 120 and 140 may be affected by activity of device 160.

In one example, device 160 may include a hacking device. According to this example, the hacking device may listen to carrier signal 150, e.g., when device 160 is in proximity to devices 120 and/or 140, and may obtain first information 132 and/or second information 152 being exchanged between devices 120 and 140.

In another example, device 160 may include a non-hacking device. For example, device 120 and 160 may include first and second devices, belonging to the same user or to different users. In one example, device 120 may include Smartphone carried by a user, and device 160 may include an NFC smartcard, for example, in a wallet of the user. According to this example, load of an antenna of device 160 may affect carrier signal 150.

In some demonstrative embodiments, device 120 may be configured to detect an activity of another listening device, for example, during communications performed between device 120 and device 140, e.g., as described below.

In some demonstrative embodiments, the activity of device 160 may affect attributes of carrier signal 150, and may increase a number of modulation levels of carrier signal 150.

For example, carrier signal 150 may have a first modulation level, e.g., modulation level 202 (FIG. 2), for example, if both devices 120 and 160 modulate carrier signal 150 to transmit a logical zero; carrier signal 150 may have a second modulation level, e.g., modulation level 204 (FIG. 2), for example, if one of devices 120 and 160 modulates carrier signal 150 to transmit a logical zero and another one of devices 120 and 160 modulates carrier signal 150 to transmit a logical one; and/or carrier signal 150 may have a third modulation level, e.g., a modulation level 205 (FIG. 2), for example, if both devices 120 and 160 modulate carrier signal 150 to transmit a logical one.

In some demonstrative embodiments, device 120 may include a controller 134 configured to detect an activity of the other wireless communication device.

In some demonstrative embodiments, controller 134 may detect an activity of the other wireless communication device based on a plurality of sensed modulation levels of carrier signal 150.

In some demonstrative embodiments, the plurality of sensed modulation levels may include amplitude levels of carrier signal 150 sensed during a transmission from device 120 to device 140, for example, during transmission of second information 132 from device 120 to device 140.

In some demonstrative embodiments, controller 134 may detect the activity of the other wireless communication device, based on a number of the sensed modulation levels of carrier signal 150.

In some demonstrative embodiments, controller 134 may detect the activity of the other wireless communication device, based on a comparison between the predefined number of transmission modulation levels of the load modulation scheme used to modulate the transmission from device 120 to device 140, and the number of the sensed modulation levels.

In some demonstrative embodiments, controller 134 may detect the activity of the other wireless communication device, e.g., if the number of the sensed modulation levels is greater than the predefined number of the transmission modulation levels of the load modulation scheme.

In some demonstrative embodiments, the load modulation scheme used to modulate the transmission from device 120 to device 140 may include two transmission levels, e.g., as described above with reference to FIG. 2. According to these embodiments, controller 134 may detect the activity of the other wireless communication device, e.g., if the number of the sensed modulation levels is greater than two.

In one example, the activity of device 160 may result in three sensed modulation levels, e.g., as described above.

In some demonstrative embodiments, controller 134 may terminate the transmission of second information 132 to device 140 and/or may terminate a connection between device 120 and device 140, for example, if the number of the sensed modulation levels represents activity by device 160, e.g., if the number of sensed modulation levels is greater than two.

In some demonstrative embodiments, device 120 may include a sensor 136 to sense the plurality of sensed modulation levels of carrier signal 150, e.g., during the transmission from device 120 to device 140.

In some demonstrative embodiments, sensor 136 may include an analog to digital converter (ADC) 138 configured to sense the plurality of sensed modulation levels of carrier signal 150.

In some demonstrative embodiments, ADC 138 may be configured to sense carrier signal 150 modulated by transmitter 148, for example, during reception of a transmission from device 140 at receiver 118, e.g., to extract first information 152.

In some demonstrative embodiments, transmitter 148 may transmit first information 152 by modulating carrier signal 150 according to a polling modulation scheme, which may include first and second polling amplitude levels. The first and second polling amplitude levels may be separated by a relatively large amplitude difference, e.g., compared to a magnitude of the first and second polling amplitude levels.

In some demonstrative embodiments, ADC 138 may be configured to operate at a first accuracy level ("low sensitivity mode" or "low accuracy mode"), at which ADC 138 may differentiate between amplitude levels of carrier signal at a reduced granularity.

In some demonstrative embodiments, ADC 138 may have reduced power consumption, for example, when operating at the low accuracy mode.

In some demonstrative embodiments, ADC 138 may be configured to sense carrier signal 150 and to extract first information 152, for example, when operating at the first accuracy level.

In some demonstrative embodiments, ADC 138 may be able to differentiate between the first and second polling amplitude levels, when operating at the first accuracy level, for example, due to the relatively large amplitude difference between the first and second polling amplitude levels. In contrast, when operating at the first accuracy level, ADC 138 may not be able to differentiate between the first and second load amplitude levels of the transmission from device 120 to device 140, for example, due to the relatively small amplitude difference between transmission modulation levels of the load modulation scheme utilized by device 120, e.g., as described above with reference to FIG. 2.

In some demonstrative embodiments, controller 134 may not be able to detect the activity of device 160, for example, if ADC 138 is not able to differentiate between more than two amplitude levels of carrier signal 150, e.g., at least three amplitude levels.

In one example, controller 134 may not be able to detect the activity of device 160, for example, if ADC 138 is not able to differentiate between an amplitude level ("the interfering amplitude level") e.g., modulation level 205 (FIG. 2), caused by the activity of device 160, and amplitude levels 202 and 204 (FIG. 2).

In some demonstrative embodiments, controller 134 may control ADC 138 to operate at a second accuracy level ("increased sensitivity mode" or "increased accuracy mode"), at which ADC 138 is to differentiate between a second number of amplitude levels, which is greater than the predefined number of transmission modulation levels of the load modulation scheme.

For example, ADC 138 may be configured to differentiate between more than two amplitude levels, e.g., three amplitude levels, four amplitude levels, or more than four amplitude levels, when operating at the increased accuracy mode.

In some demonstrative embodiments, controller 134 may control ADC 138 to operate at the increased accuracy mode to enable ADC 138 to sense the plurality of sensed modulation level of carrier signal 150, during the transmission, e.g., of second information 132, from device 120 to device 140.

In some demonstrative embodiments, ADC 138 may be configured to differentiate between three amplitude levels, for example, when operating at the increased accuracy mode.

In one example, ADC 138 may be configured to differentiate between amplitude level 202 (FIG. 2), amplitude level 204 (FIG. 2), and the interfering amplitude level, for example, when ADC 138 operates at the increased accuracy mode.

In some demonstrative embodiments, controller 134 may detect the activity of device 160, for example, if ADC 138 detects three amplitude levels of carrier signal 150 during the transmission from device 120 to device 140.

In some demonstrative embodiments, controller 134 may be configured to detect the activity of device 160 based on the number of the sensed amplitude levels, e.g., even if controller 134 may not identify which amplitude level is the result by the activity of device 160.

In some demonstrative embodiments, a power consumption of ADC 138, when operating at the increased accuracy mode, may be higher than the power consumption of ADC 138, when operating at the low accuracy mode.

In some demonstrative embodiments, controller 134 may control ADC 138 to operate at the second accuracy level for relatively short time periods, e.g., to reduce power consumption of device 120.

In one example, controller 134 may control ADC 138 to operate at the second accuracy level, for example, during at least part of a transmission, e.g., of second information 132, from device 120 to device 140; at a beginning of the transmission from device 120 to device 140; on a periodic basis; and/or upon receiving an indication of suspicious activity, for example, from an OS of device 120.

In some demonstrative embodiments, switching between the increased and the low sensitivity modes of ADC 138 may enable controller 134 to detect the activity of device 160, e.g., while maintaining a reduced power consumption of device 120.

Figure 3:
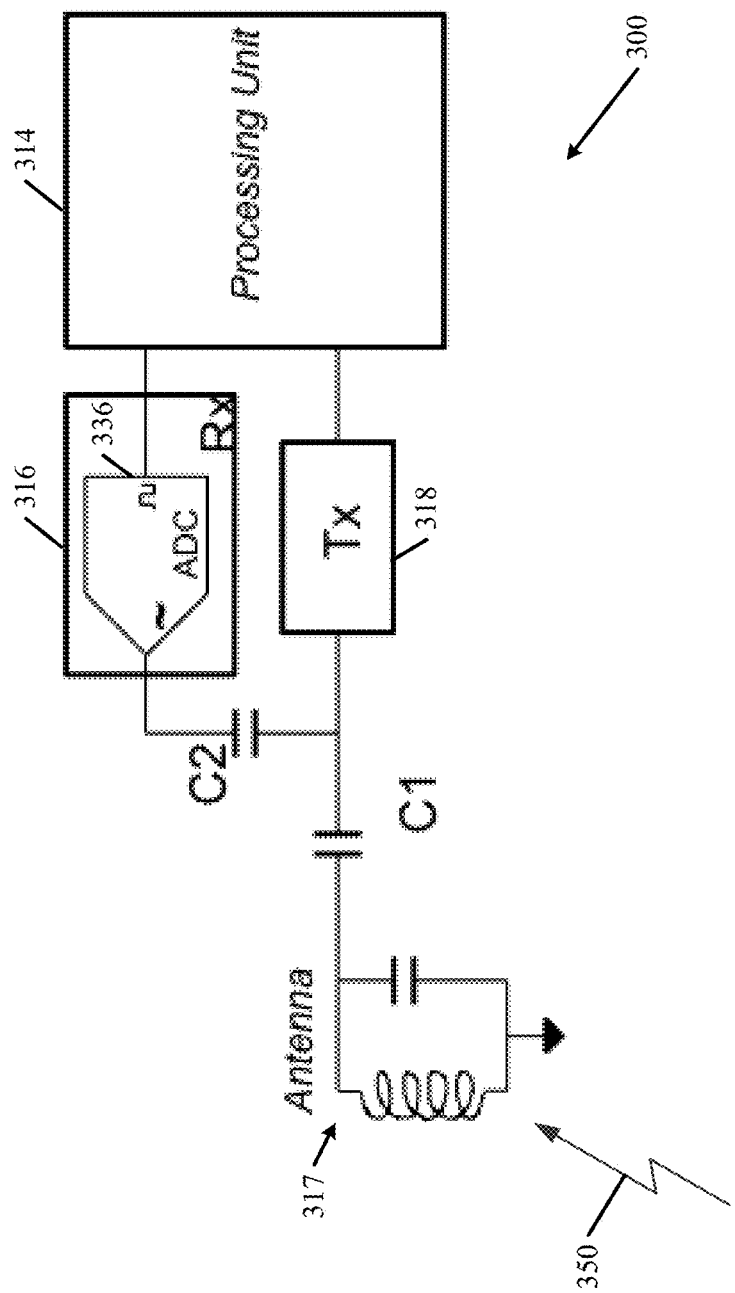
FIG. 3 is a schematic illustration of a hardware architecture of a Near Field Communication (NFC) module, in accordance with some demonstrative embodiments.

Reference is made to FIG. 3, which schematically illustrates a hardware architecture of an NFC module 300, in accordance with some demonstrative embodiments. For example, NFC module 300 may perform the functionality of NFC module 112 (FIG. 1).

In some demonstrative embodiments, NFC module 300 may include an antenna 317 to receive an NFC carrier signal 350. For example, antenna 317 may perform the functionality of antenna 117 (FIG. 1), and/or NFC carrier signal 350 may include carrier signal 150 (FIG. 1).

In some demonstrative embodiments, NFC module 300 may include a transmitter 318 and a receiver 316. For example, transmitter 318 may perform the functionality of transmitter 118 (FIG. 1), and/or receiver 316 may perform the functionality of receiver 116 (FIG. 1).

In some demonstrative embodiments, NFC module 300 may include an ADC 336 to sense amplitude levels of carrier signal 350. For example, ADC 336 may perform the functionality of ADC 138 (FIG. 1).

In some demonstrative embodiments, NFC module 300 may include a processing unit 314 to process data communicated via carrier signal 350 and/or to control one or more functionalities of NFC module 300.

In some demonstrative embodiments, processing unit 314 may control ADC 336 to switch between the first and second sensitivity levels. For example, processing unit 314 may control ADC 336 to switch to the increased sensitivity mode to detect an activity of another wireless communication device. For example, processing unit 314 may perform the functionality of controller 114 (FIG. 1).

Figure 4:
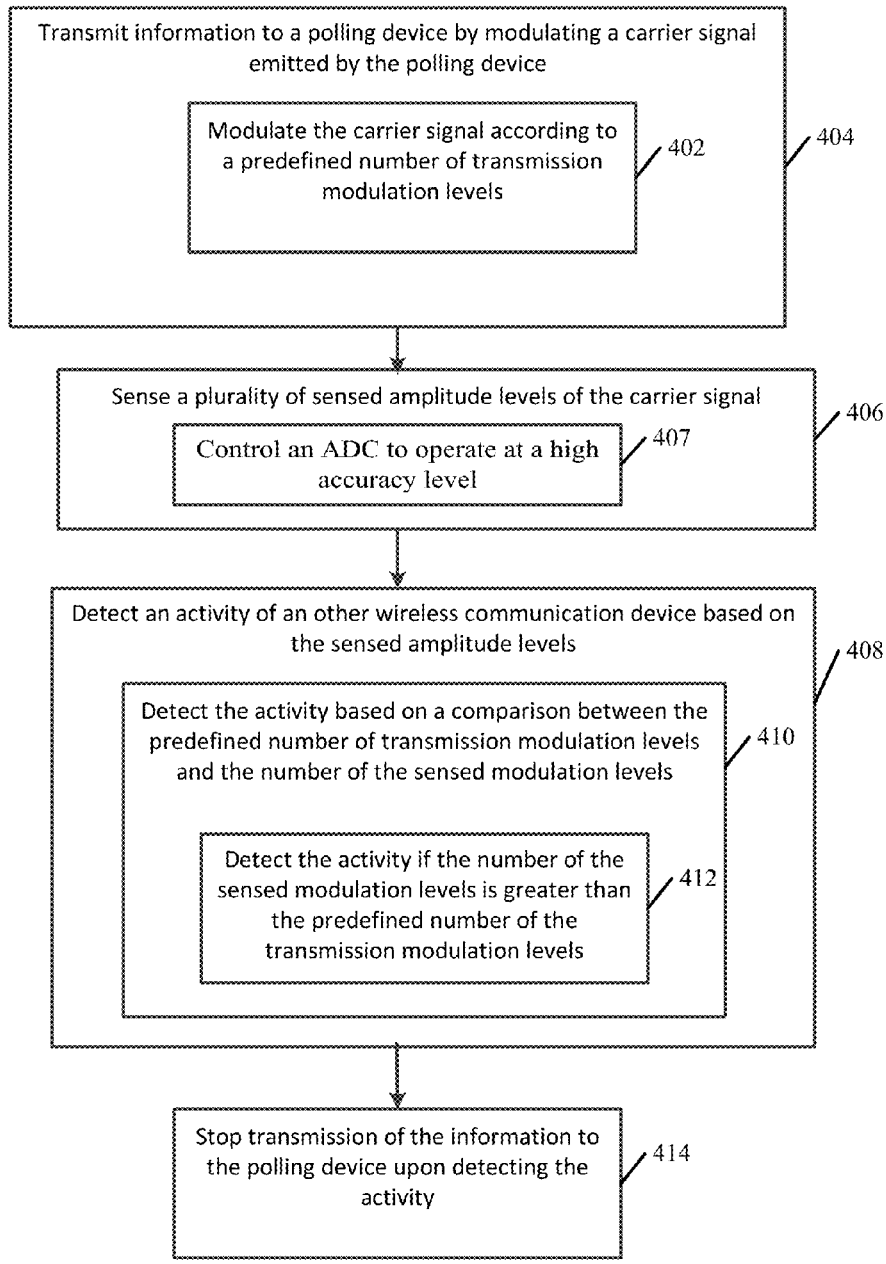
FIG. 4 is a schematic flow chart illustration of a method of detecting an activity of a wireless communication device, in accordance with some demonstrative embodiments.

Reference is now made to FIG. 4, which schematically illustrates a method of detecting an activity of a wireless communication device, in accordance with some demonstrative embodiments. For example, one or more of the operations of the method of FIG. 4 may be performed by a system, e.g., system 100 (FIG. 1); a wireless communication device, e.g., device 120 (FIG. 1); an NFC module, e.g., NFC module 112 (FIG. 1); a controller, e.g., controller 134 (FIG. 1); an ADC, e.g., ADC 138 (FIG. 1); a receiver, e.g., receiver 116 (FIG. 1); and/or a transmitter, e.g., transmitter 118 (FIG. 1).

As indicated at block 402, the method may include transmitting information to a polling device by modulating a carrier signal emitted by the polling device. For example, transmitter 118 (FIG. 1) may transmit second information 132 (FIG. 1) by modulating carrier signal 150 (FIG. 1) emitted by device 140 (FIG. 1), e.g., as described above.

As indicated at block 404, transmitting the information to the polling device may include modulating the carrier signal according to a predefined number of transmission modulation levels. For example, transmitter 118 (FIG. 1) may modulate carrier signal 150 according to the predefined number of transmission modulation levels of the load modulation scheme, e.g., as described above.

As indicated at block 406, the method may include sensing a plurality of sensed amplitude levels of the carrier signal. For example, sensor 136 (FIG. 1) may sense the plurality of sensed amplitude levels of carrier signal 150 (FIG. 1), e.g., as described above.

As indicated at block 407, sensing the plurality of sensed amplitude levels may include controlling an ADC to operate at an increased accuracy level, in which the ADC is to differentiate between a number of amplitude levels, which is greater than the predefined number of transmission modulation levels. For example, controller 134 (FIG. 1) may control ADC 138 (FIG. 1) to operate at the increased accuracy level, e.g., as described above.

As indicated at block 408, the method may include detecting an activity of another wireless communication device based on the sensed amplitude levels. For example, controller 134 (FIG. 1) may detect the activity of device 160 (FIG. 1) based on the sensed amplitude levels, e.g., as described above.

As indicated at block 410, detecting the activity of the other wireless communication device may include detecting the activity based on a number of the sensed amplitude levels. For example, controller 134 (FIG. 1) may detect the activity of device 160 (FIG. 1) based on the number of the sensed amplitude levels, e.g., as described above.

As indicated at block 412, detecting the activity of the other wireless communication device may include detecting the activity, based on a comparison between the predefined number of transmission modulation levels and the number of the sensed modulation levels. For example, controller 134 (FIG. 1) may detect the activity of device 160 (FIG. 1), based on the comparison between the predefined number of transmission modulation levels and the number of the sensed modulation levels, e.g., as described above.

As indicated at block 414, the method may include stopping transmission of the information to the polling device upon detecting the activity. For example, controller 134 (FIG. 1) may stop the transmission of information 132 (FIG. 1), e.g., upon detecting the activity of device 160 (FIG. 1), e.g., as described above.

Figure 5:
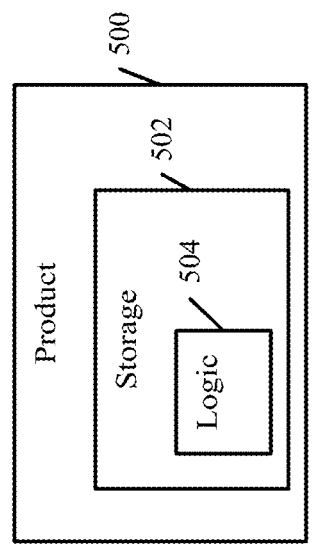
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable non-transitory storage media 502 to store logic 504, which may be used, for example, to control and/or to perform at least part of the functionality of device 120 (FIG. 1), NFC module 112 (FIG. 1), controller 134 (FIG. 1), ADC 138 (FIG. 1), receiver 116 (FIG. 1), transmitter 118 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or media 502 may include one or more types of computer-readable storage media capable of storing data, including volatile memory, non-volatile memory, removable or non-removable memory, erasable or non-erasable memory, writeable or re-writeable memory, and the like. For example, machine-readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a Near-Field Communication (NFC) device comprising a transmitter to transmit information to a polling device by modulating a carrier signal emitted by the polling device; a sensor to sense a plurality of sensed modulation levels of the carrier signal; and a controller to detect an activity of an other NFC device based on the sensed modulation levels.

Example 2 includes the subject matter of Example 1, and optionally, wherein the controller is to detect the activity based on a number of the sensed modulation levels.

Example 3 includes the subject matter of Example 2, and optionally, wherein the transmitter is to modulate the carrier signal according to a predefined number of transmission modulation levels, and wherein the controller is to detect the activity based on a comparison between the predefined number of transmission modulation levels and the number of the sensed modulation levels.

Example 4 includes the subject matter of Example 3, and optionally, wherein the controller is to detect the activity, if the number of the sensed modulation levels is greater than the predefined number of the transmission modulation levels.

Example 5 includes the subject matter of any one of Examples 1-4, and optionally, wherein, upon detecting the activity, the controller is to stop transmission of the information to the polling device.

Example 6 includes the subject matter of any one of Examples 1-5, and optionally, wherein the transmitter is to modulate the carrier signal according to a predefined number of transmission modulation levels, and wherein the sensor comprises an analog to digital converter (ADC) configured to differentiate between a number of amplitude levels, which is greater than the predefined number of transmission modulation levels.

Example 7 includes the subject matter of Example 6, and optionally, wherein the controller is to control the ADC to operate at a first accuracy level, in which the ADC is to differentiate between a first number of amplitude levels, which is equal to the predefined number of transmission modulation levels, and to control the ADC to operate at a second accuracy level, in which the ADC is to differentiate between a second number of amplitude levels, which is greater than the predefined number of transmission modulation levels.

Example 8 includes the subject matter of Example 7, and optionally, wherein the first number of amplitude levels includes two modulation levels, and wherein the second number of amplitude levels includes more than two modulation levels.

Example 9 includes the subject matter of Example 7 or 8, and optionally, wherein the controller is to control the ADC to operate at the first accuracy level, when the NFC device is to receive information from the polling device, and to operate at the second accuracy level during at least part of a transmission of the information to the polling device.

Example 10 includes the subject matter of any one of Examples 1-9, and optionally, wherein the NFC device comprises a listening NFC device.

Example 11 includes the subject matter of any one of Examples 1-10, and optionally, wherein the NFC device comprises an NFC emulated card device, or an NFC card device.

Example 12 includes a system comprising a wireless communication device including one or more antennas; a processor; a memory; a receiver to receive first information from a poling device modulated over a carrier signal emitted by the polling device; a transmitter to transmit second information to the polling device by modulating the carrier signal; a sensor to sense a plurality of sensed modulation levels of the modulated carrier signal; and a controller to detect an activity of an other wireless communication device based on the sensed modulation levels.

Example 13 includes the subject matter of Example 12, and optionally, wherein the controller is to detect the activity based on a number of the sensed modulation levels.

Example 14 includes the subject matter of Example 13, and optionally, wherein the transmitter is to modulate the carrier signal according to a predefined number of transmission modulation levels, and wherein the controller is to detect the activity based on a comparison between the predefined number of transmission modulation levels and the number of the sensed modulation levels.

Example 15 includes the subject matter of Example 14, and optionally, wherein the controller is to detect the activity, if the number of the sensed modulation levels is greater than the predefined number of the transmission modulation levels.

Example 16 includes the subject matter of any one of Examples 12-15, and optionally, wherein, upon detecting the activity, the controller is to stop transmission of the second information to the polling device.

Example 17 includes the subject matter of any one of Examples 12-16, and optionally, wherein the transmitter is to modulate the carrier signal according to a predefined number of transmission modulation levels, and wherein the sensor comprises an analog to digital converter (ADC) configured to differentiate between a number of amplitude levels, which is greater than the predefined number of transmission modulation levels.

Example 18 includes the subject matter of Example 17, and optionally, wherein the controller is to control the ADC to operate at a first accuracy level, in which the ADC is to differentiate between a first number of amplitude levels, which is equal to the predefined number of transmission modulation levels, and to control the ADC to operate at a second accuracy level, in which the ADC is to differentiate between a second number of amplitude levels, which is greater than the predefined number of transmission modulation levels.

Example 19 includes the subject matter of Example 18, and optionally, wherein the first number of amplitude levels includes two modulation levels, and wherein the second number of amplitude levels includes more than two modulation levels.

Example 20 includes the subject matter of Example 18 or 19, and optionally, wherein the controller is to control the ADC to operate at the first accuracy level, when the wireless communication device is to receive the first information from the polling device, and to operate at the second accuracy level during at least part of a transmission of the second information to the polling device.

Example 21 includes the subject matter of any one of Examples 12-20, and optionally, wherein the wireless communication device comprises a listening near field communication (NFC) device.

Example 22 includes the subject matter of Example 21, and optionally, wherein the listening NFC device comprises an NFC emulated card device, or an NFC card device.

Example 23 includes a method comprising transmitting information to a polling device by modulating a carrier signal emitted by the polling device; sensing a plurality of sensed modulation levels of the carrier signal; and detecting an activity of an other wireless communication device based on the sensed modulation levels.

Example 24 includes the subject matter of Example 23, and optionally, comprising detecting the activity based on a number of the sensed modulation levels.

Example 25 includes the subject matter of Example 24, and optionally, comprising modulating the carrier signal according to a predefined number of transmission modulation levels, and detecting the activity based on a comparison between the predefined number of transmission modulation levels and the number of the sensed modulation levels.

Example 26 includes the subject matter of Example 25, and optionally, comprising detecting the activity, if the number of the sensed modulation levels is greater than the predefined number of the transmission modulation levels.

Example 27 includes the subject matter of any one of Examples 23-26, and optionally, comprising stopping transmission of the information to the polling device upon detecting the activity.

Example 28 includes the subject matter of any one of Examples 23-27, and optionally, comprising modulating the carrier signal according to a predefined number of transmission modulation levels, and differentiating between a number of amplitude levels, which is greater than the predefined number of transmission modulation levels.

Example 29 includes the subject matter of Example 28, and optionally, comprising controlling an analog to digital converter (ADC) to operate at a first accuracy level, in which the ADC is to differentiate between a first number of amplitude levels, which is equal to the predefined number of transmission modulation levels, and controlling the ADC to operate at a second accuracy level, in which the ADC is to differentiate between a second number of amplitude levels, which is greater than the predefined number of transmission modulation levels.

Example 30 includes the subject matter of Example 29, and optionally, wherein the first number of amplitude levels includes two modulation levels, and wherein the second number of amplitude levels includes more than two modulation levels.

Example 31 includes the subject matter of Example 29 or 30, and optionally, comprising controlling the ADC to operate at the first accuracy level, when receiving information from the polling device, and to operate at the second accuracy level during at least part of a transmission of the information to the polling device.

Example 32 includes a product including one or more tangible computer-readable non-transitory storage media comprising computer-executable instructions operable to, when executed by at least one computer processor, enable the at least one computer processor to implement a method comprising transmitting information to a polling device by modulating a carrier signal emitted by the polling device; sensing a plurality of sensed modulation levels of the carrier signal; and detecting an activity of an other wireless communication device based on the sensed modulation levels.

Example 33 includes the subject matter of Example 32, and optionally, wherein the method comprises detecting the activity based on a number of the sensed modulation levels.

Example 34 includes the subject matter of Example 33, and optionally, wherein the method comprises modulating the carrier signal according to a predefined number of transmission modulation levels, and detecting the activity based on a comparison between the predefined number of transmission modulation levels and the number of the sensed modulation levels.

Example 35 includes the subject matter of Example 34, and optionally, wherein the method comprises detecting the activity, if the number of the sensed modulation levels is greater than the predefined number of the transmission modulation levels.

Example 36 includes the subject matter of any one of Examples 32-35, and optionally, wherein the method comprises stopping transmission of the information to the polling device upon detecting the activity.

Example 37 includes the subject matter of any one of Examples 32-36, and optionally, wherein the method comprises modulating the carrier signal according to a predefined number of transmission modulation levels, and differentiating between a number of amplitude levels, which is greater than the predefined number of transmission modulation levels.

Example 38 includes the subject matter of Example 37, and optionally, wherein the method comprises controlling an analog to digital converter (ADC) to operate at a first accuracy level, in which the ADC is to differentiate between a first number of amplitude levels, which is equal to the predefined number of transmission modulation levels, and controlling the ADC to operate at a second accuracy level, in which the ADC is to differentiate between a second number of amplitude levels, which is greater than the predefined number of transmission modulation levels.

Example 39 includes the subject matter of Example 38, and optionally, wherein the first number of amplitude levels includes two modulation levels, and wherein the second number of amplitude levels includes more than two modulation levels.

Example 40 includes the subject matter of Example 38 or 39, and optionally, wherein the method comprises controlling the ADC to operate at the first accuracy level, when receiving information from the polling device, and to operate at the second accuracy level during at least part of a transmission of the information to the polling device.

Example 41 includes an apparatus comprising means for transmitting information to a polling device by modulating a carrier signal emitted by the polling device; means for sensing a plurality of sensed modulation levels of the carrier signal; and means for detecting an activity of an other wireless communication device based on the sensed modulation levels.

Example 42 includes the subject matter of Example 41, and optionally, comprising means for detecting the activity based on a number of the sensed modulation levels.

Example 43 includes the subject matter of Example 42, and optionally, comprising means for modulating the carrier signal according to a predefined number of transmission modulation levels, and means for detecting the activity based on a comparison between the predefined number of transmission modulation levels and the number of the sensed modulation levels.

Example 44 includes the subject matter of Example 43, and optionally, comprising means for detecting the activity, if the number of the sensed modulation levels is greater than the predefined number of the transmission modulation levels.

Example 45 includes the subject matter of any one of Examples 41-44, and optionally, comprising means for stopping transmission of the information to the polling device upon detecting the activity.

Example 46 includes the subject matter of any one of Examples 41-45, and optionally, comprising means for modulating the carrier signal according to a predefined number of transmission modulation levels, and means for differentiating between a number of amplitude levels, which is greater than the predefined number of transmission modulation levels.

Example 47 includes the subject matter of Example 46, and optionally, comprising means for controlling an analog to digital converter (ADC) to operate at a first accuracy level, in which the ADC is to differentiate between a first number of amplitude levels, which is equal to the predefined number of transmission modulation levels, and controlling the ADC to operate at a second accuracy level, in which the ADC is to differentiate between a second number of amplitude levels, which is greater than the predefined number of transmission modulation levels.

Example 48 includes the subject matter of Example 47, and optionally, wherein the first number of amplitude levels includes two modulation levels, and wherein the second number of amplitude levels includes more than two modulation levels.

Example 49 includes the subject matter of Example 47 or 48, and optionally, comprising means for controlling the ADC to operate at the first accuracy level, when receiving information from the polling device, and to operate at the second accuracy level during at least part of a transmission of the information to the polling device.

Example 50 includes a wireless communication device comprising a transmitter to transmit information to a polling device by modulating a carrier signal emitted by the polling device; a sensor to sense a plurality of sensed modulation levels of the carrier signal; and a controller to detect an activity of an other wireless communication device based on the sensed modulation levels.

Example 51 includes the subject matter of Example 50, and optionally, wherein the controller is to detect the activity based on a number of the sensed modulation levels.

Example 52 includes the subject matter of Example 51, and optionally, wherein the transmitter is to modulate the carrier signal according to a predefined number of transmission modulation levels, and wherein the controller is to detect the activity based on a comparison between the predefined number of transmission modulation levels and the number of the sensed modulation levels.

Example 53 includes the subject matter of Example 52, and optionally, wherein the controller is to detect the activity, if the number of the sensed modulation levels is greater than the predefined number of the transmission modulation levels.

Example 54 includes the subject matter of any one of Examples 50-53, and optionally, wherein, upon detecting the activity, the controller is to stop transmission of the information to the polling device.

Example 55 includes the subject matter of any one of Examples 50-54, and optionally, wherein the transmitter is to modulate the carrier signal according to a predefined number of transmission modulation levels, and wherein the sensor comprises an analog to digital converter (ADC) configured to differentiate between a number of amplitude levels, which is greater than the predefined number of transmission modulation levels.

Example 56 includes the subject matter of Example 55, and optionally, wherein the controller is to control the ADC to operate at a first accuracy level, in which the ADC is to differentiate between a first number of amplitude levels, which is equal to the predefined number of transmission modulation levels, and to control the ADC to operate at a second accuracy level, in which the ADC is to differentiate between a second number of amplitude levels, which is greater than the predefined number of transmission modulation levels.

Example 57 includes the subject matter of Example 56, and optionally, wherein the first number of amplitude levels includes two modulation levels, and wherein the second number of amplitude levels includes more than two modulation levels.

Example 58 includes the subject matter of Example 56 or 57, and optionally, wherein the controller is to control the ADC to operate at the first accuracy level, when the wireless communication device is to receive information from the polling device, and to operate at the second accuracy level during at least part of a transmission of the information to the polling device.

Example 59 includes the subject matter of any one of Examples 50-58, and optionally, wherein the wireless communication device comprises a listening near field communication (NFC) device.

Example 60 includes the subject matter of Example 59, and optionally, wherein the listening NFC device comprises an NFC emulated card device, or an NFC card device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A Near-Field Communication (NFC) device comprising:
a transmitter to transmit information to a polling device by modulating a carrier signal emitted by said polling device, said transmitter is to modulate said carrier signal according to a predefined number of transmission modulation levels;
a sensor to sense, during at least part of transmission of the information from the NFC device to the polling device, a plurality of sensed modulation levels of the carrier signal; and
a controller to detect an activity of an other NFC device based on a number of said sensed modulation levels of the carrier signal during at least part of the transmission of the information from the NFC device to the polling device, said controller is configured to compare the number of said sensed modulation levels of the carrier signal to said predefined number of transmission modulation levels, the controller configured to determine that said activity is detected based on a determination that the number of said sensed modulation levels of the carrier signal is greater than said predefined number of transmission modulation levels.

2. The NFC device of claim 1, wherein, upon detecting said activity, said controller is to stop the transmission of said information to said polling device.

3. The NFC device of claim 1, wherein said sensor comprises an analog to digital converter (ADC) configured to differentiate between a number of amplitude levels, which is greater than said predefined number of transmission modulation levels.

4. The NFC device of claim 3, wherein said controller is to control said ADC to operate at a first accuracy level, in which said ADC is to differentiate between a first number of amplitude levels, which is equal to the predefined number of transmission modulation levels, and to control said ADC to operate at a second accuracy level, in which said ADC is to differentiate between a second number of amplitude levels, which is greater than the predefined number of transmission modulation levels.

5. The NFC device of claim 4, wherein the first number of amplitude levels includes two modulation levels, and wherein the second number of amplitude levels includes more than two modulation levels.

6. The NFC device of claim 4, wherein said controller is to control said ADC to operate at said first accuracy level, when said NFC device is to receive information from said polling device, and to operate at said second accuracy level during at least part of the transmission of said information to said polling device.

7. The NFC device of claim 1, wherein said NFC device comprises a listening NFC device.

8. The NFC device of claim 1, wherein said NFC device comprises an NFC emulated card device, or an NFC card device.

9. A system comprising:
a wireless communication device including:
one or more antennas;
a processor;
a memory;
a receiver to receive first information from a poling device modulated over a carrier signal emitted by said polling device;
a transmitter to transmit second information to said polling device by modulating said carrier signal, said transmitter is to modulate said carrier signal according to a predefined number of transmission modulation levels;
a sensor to sense, during at least part of transmission of the second information from the wireless communication device to the polling device, a plurality of sensed modulation levels of the carrier signal; and
a controller to detect an activity of an other wireless communication device based on a number of said sensed modulation levels of the modulated carrier signal during at least part of the transmission of the second information from the wireless communication device to the polling device, said controller is configured to compare the number of said sensed modulation levels of the carrier signal to said predefined number of transmission modulation levels, the controller configured to determine that said activity is detected based on a determination that the number of said sensed modulation levels of the carrier signal is greater than said predefined number of transmission modulation levels.

10. The system of claim 9, wherein, upon detecting said activity, said controller is to stop the transmission of said information to said polling device.

11. The system of claim 9, wherein said sensor comprises an analog to digital converter (ADC) configured to differentiate between a number of amplitude levels, which is greater than said predefined number of transmission modulation levels.

12. The system of claim 11, wherein said controller is to control said ADC to operate at a first accuracy level, in which said ADC is to differentiate between a first number of amplitude levels, which is equal to the predefined number of transmission modulation levels, and to control said ADC to operate at a second accuracy level, in which said ADC is to differentiate between a second number of amplitude levels, which is greater than the predefined number of transmission modulation levels.

13. The system of claim 12, wherein said first number of amplitude levels comprises two modulation levels, and wherein the second number of amplitude levels comprises more than two modulation levels.

14. The system of claim 9, wherein said wireless communication device comprises a listening near field communication (NFC) device.

15. A method comprising:
transmitting information to a polling device by modulating a carrier signal emitted by said polling device, modulating said carrier signal comprises modulating said carrier signal according to a predefined number of transmission modulation levels;
sensing, during at least part of transmission of the information to the polling device, a plurality of sensed modulation levels of the carrier signal; and
detecting an activity of an other wireless communication device based on a number of said sensed modulation levels of the carrier signal during at least part of the transmission of the information to the polling device, detecting said activity comprises comparing the number of said sensed modulation levels of the carrier signal to said predefined number of transmission modulation levels, and determining that said activity is detected based on a determination that the number of said sensed modulation levels of the carrier signal is greater than said predefined number of transmission modulation levels.

16. The method of claim 15 comprising differentiating between a number of amplitude levels, which is greater than said predefined number of transmission modulation levels.

17. The method of claim 15 comprising, upon detecting said activity, stopping the transmission of said information to said polling device.

18. A product including one or more tangible computer-readable non-transitory storage media comprising computer-executable instructions operable to, when executed by at least one processor, enable the at least one processor to cause a Near-Field Communication (NFC) device to:
transmit information to a polling device by modulating a carrier signal emitted by said polling device, modulating said carrier signal comprises modulating said carrier signal according to a predefined number of transmission modulation levels;
sense, during at least part of transmission of the information from the NFC device to the polling device, a plurality of sensed modulation levels of the carrier signal; and
detect an activity of an other NFC device based on a number of said sensed modulation levels of the carrier signal during at least part of the transmission of the information from the NFC device to the polling device, detecting said activity comprises comparing the number of said sensed modulation levels of the carrier signal to said predefined number of transmission modulation levels, and determining that said activity is detected based on a determination that the number of said sensed modulation levels of the carrier signal is greater than said predefined number of transmission modulation levels.

19. The product of claim 18, wherein the instructions, when executed, cause the NFC device to, upon detecting said activity, stop the transmission of said information to said polling device.

20. The product of claim 18, wherein the instructions, when executed, cause the NFC device to differentiate between a number of amplitude levels, which is greater than said predefined number of transmission modulation levels.

21. The product of claim 20, wherein the instructions, when executed, cause the NFC device to control an analog to digital converter (ADC) to operate at a first accuracy level, in which said ADC is to differentiate between a first number of amplitude levels, which is equal to the predefined number of transmission modulation levels, and to control said ADC to operate at a second accuracy level, in which said ADC is to differentiate between a second number of amplitude levels, which is greater than the predefined number of transmission modulation levels.

22. The product of claim 21, wherein the first number of amplitude levels comprises two modulation levels, and wherein the second number of amplitude levels comprises more than two modulation levels.

* * * * *